United States Patent [19]

Jaidka

[11] Patent Number: 5,606,495
[45] Date of Patent: Feb. 25, 1997

[54] DEVICE FOR CONTROLLING AIR POLLUTION

[76] Inventor: Sandeep Jaidka, E-185 Eash of Kailash, New Delhi, 110 065, India

[21] Appl. No.: 351,189

[22] Filed: Nov. 30, 1994

[51] Int. Cl.$^6$ ............................................. G06F 19/00
[52] U.S. Cl. ........................... 364/184; 364/500; 422/105
[58] Field of Search .................................. 364/184–187, 364/183, 496, 498, 500, 497, 499, 502, 550, 551.01; 422/3, 5, 28, 105, 120, 123, 900; 96/18, 25, 26; 55/271, 274, 210; 95/1, 25, 26, 8, 10, 14

[56] References Cited

U.S. PATENT DOCUMENTS

| | | | |
|---|---|---|---|
| 3,495,385 | 2/1970 | Glass | 55/237 |
| 3,520,113 | 7/1970 | Stokes | 55/223 |
| 3,530,647 | 9/1970 | Wetzel | 55/263 |
| 3,530,649 | 9/1970 | Porsch et al. | 55/316 |
| 3,627,290 | 12/1971 | Grieve | 432/48 |
| 3,670,477 | 6/1972 | Carbo et al. | 55/227 |
| 3,691,873 | 9/1972 | Lombard et al. | 477/100 |
| 3,693,326 | 9/1972 | Deane | 55/230 |
| 3,699,750 | 10/1972 | Nepereny et al. | 55/288 |
| 3,732,075 | 5/1973 | Acaba | 422/168 |
| 3,805,686 | 4/1974 | West | 99/352 |
| 3,835,909 | 9/1974 | Douglas et al. | 126/360 A |
| 3,840,002 | 10/1974 | Douglas et al. | 126/360 A |
| 3,881,874 | 5/1975 | Shular et al. | 422/105 |
| 3,908,969 | 9/1975 | Baum et al. | 266/89 |
| 3,944,402 | 3/1976 | Cheremisinoff | 95/211 |
| 4,095,514 | 6/1978 | Roy et al. | 454/31 |
| 4,113,569 | 9/1978 | Mahar | 201/39 |
| 4,235,610 | 11/1980 | Richard | 201/39 |
| 4,274,923 | 6/1981 | Mahar | 201/39 |
| 4,325,713 | 4/1982 | Rosenberg et al. | 423/243.06 |
| 4,348,362 | 9/1982 | Foss | 422/171 |
| 4,620,856 | 11/1986 | Rosenberg et al. | 95/200 |
| 4,662,899 | 5/1987 | Tandon | 95/18 |
| 4,779,207 | 10/1988 | Woracer et al. | 364/500 X |
| 4,983,526 | 1/1991 | Suga et al. | 364/496 X |
| 5,042,997 | 8/1991 | Rhodes | 96/18 |
| 5,119,987 | 6/1992 | Kobayashi | 236/49.3 |
| 5,257,206 | 10/1993 | Hanson | 364/149 X |
| 5,356,458 | 10/1994 | Javadi et al. | 95/13 |
| 5,386,373 | 1/1995 | Keeler et al. | 364/150 X |

OTHER PUBLICATIONS

"Multiwarn–$CO_2$–Multi–Gas–Measuring Instruments with Pump and Data Storage Capabilities", Dräger; Date unknown.

"PureAir Ultra Air Purifier & Ionizer", OSMO Electronics; Date unknown.

"Euroair Air Purifier", Eureka Forbes Ltd.; Date unknown.

*Primary Examiner*—Joseph Ruggiero
*Attorney, Agent, or Firm*—Lowe, Price, LeBlanc & Becker

[57] ABSTRACT

Process and device are provided for controlling air pollution. The apparatus includes electrochemical, electrothermal and humidity sensors which sense the presence of selected polluting gases and activate an electronic circuitry which controls the release of oxygen, fresh air, or perfumed air and thereby dilutes the concentration of polluting gases within a selected space.

10 Claims, 7 Drawing Sheets

FIG. 6

VEHICULAR POLLUTION REACHING ALARMING PROPORTIONS

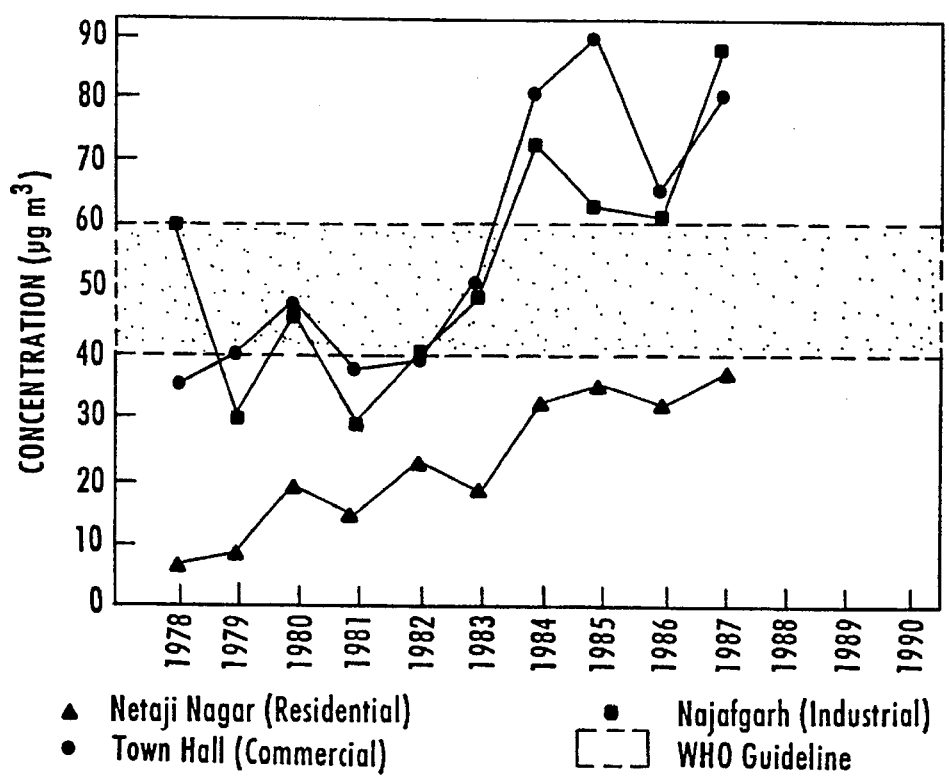
FIG. 3 ANNUAL MEAN SULPHUR DIOXIDE CONCENTRATION
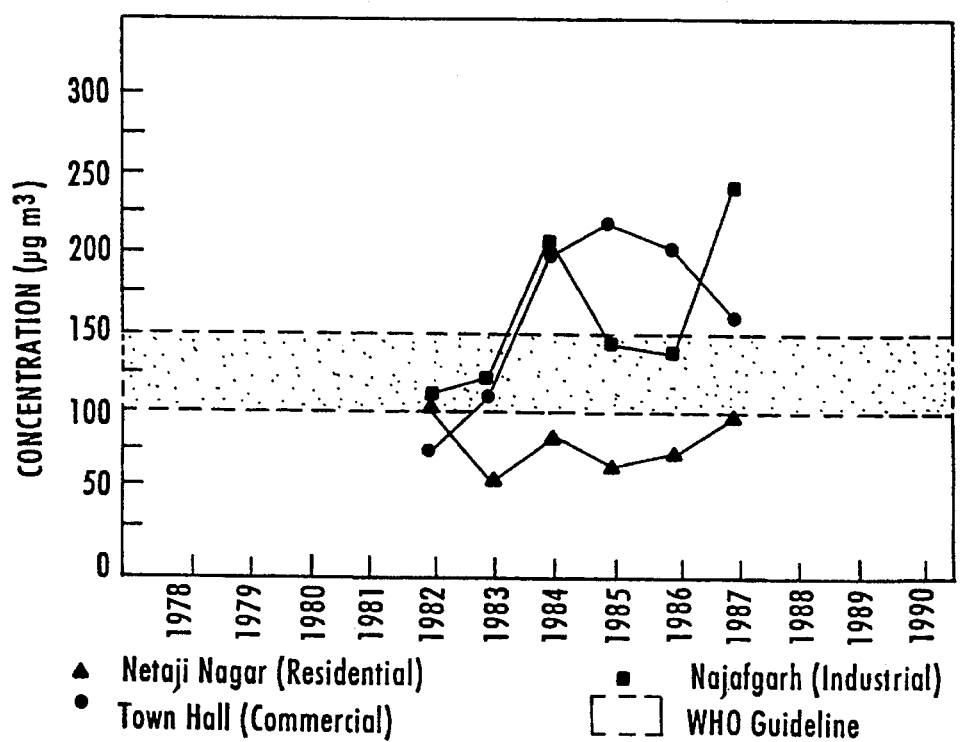
FIG. 4 ANNUAL 98 PERCENTILE SULPHUR DIOXIDE CONCENTRATION

DEVICE FOR CONTROLLING AIR POLLUTION

FIELD OF THE INVENTION

This invention relates to an air pollution control device for controlling air pollution in a predetermined space such as vehicles, kitchens, rooms and polluted industrial areas.

BACKGROUND OF THE RELATED ART

Union Territory of Delhi, the Capital of India, is the fourth most polluted city in the world. It has 2.097 million vehicles on the road, which is more than Bombay, Calcutta and Madras put together as shown in FIG. 2 of the accompanying drawings. The vehicular population has grown over the past two decades from 1,80,424 in 1971 to 20,97,155 in 1993—an increase of 11.5 times. There has also been a spectacular growth of industry in Delhi from 40,000 units in 1978 to 89,000 units in 1992 leading to further increase in air pollution.

It may be seen from FIG. 1 of the accompanying drawings that with the increase in vehicular population, the pollution has reached alarming proportions and is the primary cause of air pollution. Ambient air quality in Delhi has been monitored by the National Environment Engineering Research Institute (NEERI) as a part of National Air Quality Monitoring Network. Sulphur dioxide, suspended particulate matter (SPM), nitrogen peroxide and carbon monoxide have been measured at different sites at Delhi. It may be seen from FIGS. 3 and 4 of the accompanying drawing that concentrations of sulphur dioxide are consistently higher at the commercial and industrial sites and has exceeded the WHO guideline range in each year since 1984. At residential sites also, it is increasing and approaching the WHO guideline. Estimated Emissions of SPM follow a pattern very similar to that for sulphur dioxide emissions. (See FIG. 5.) Emission inventories for carbon monoxide in Delhi suggest that the major source, as in most other cities of the world, is transportation and in particular motor vehicles. It is estimated by NEERI that carbon monoxide emissions have increased from 140,000 tonnes per annum in 1980 to 265,000 tonnes per annum in 1990 and total carbon monoxide emissions are projected to reach over 400,000 tonnes per annum by the year 2000. Domestic emissions were around 42,000 tonnes per annum in 1990. The increase in motor vehicle pollution accounts for the huge increase in carbon monoxide emission. Total emissions of oxides of nitrogen dioxide ($NO_2$) in 1990 were around 73,000 tonnes per annum and follow a trend similar to that for carbon monoxide. (See FIG. 5.)

The trend in air pollution in Delhi and other big cities in India and abroad is upward through increasing urbanization and associated motorization and industrialization.

SUMMARY OF THE INVENTION

A principal object of this invention is therefore to control pollution in a predetermined space, such as in vehicles moving on the road, and in kitchens, rooms, polluted industrial areas, and the like, reducing the pollution to desired limits.

Accordingly, a preferred embodiment of this invention provides air pollution control device which comprises:

at least one sensing device for sensing at least one selected polluting gas in said space and for generating a corresponding signal;

a signal conditioning circuit for receiving and amplifying said signal generated by said sensing device;

a comparator circuit for comparing the amplified signal with a predetermined reference signal and providing a corresponding output signal;

a timing circuit for receiving the output signal from said comparator circuit and generating a corresponding timing signal;

pollution diluting means for providing at least one diluting gas for diluting the at least one polluting gas present in said space until desired limits are reached;

decision logic means responding to said timing signal for controlling activation of said pollution diluting means; and audio/visual means for indicating that the at least one pollutant gas is present and needs to be diluted and for responding to said activation of said pollution dilution means.

The sensing device preferably includes one or more electrochemical sensors/transducers which are respectively sensitive to the presence of ambient carbon monoxide, sulphur dioxide, nitrogen peroxide and ammonia and may include thermoelectric and humidity sensors. An indicator means is provided in the signal conditioning circuit to indicate the current pollution level of the reference pollution level. The power circuit includes a parameter controller and a power management circuit. The parameter controller preferably consists of a calibration circuit which is connected to a timing management circuit and a voltage management circuit, the output from the voltage management circuit being connected to the sensing device for its monitoring at a predetermined condition. Two or more sensing devices preferably are connected in parallel for better functioning of the air pollution control device. The comparator circuit, timing circuit, reference generator means and decision logic means preferably are embodied in a microcontroller provided with means for automatic operation.

The pollution diluting means preferably consists of an electromechanical releasing means connected to the oxygen/fresh air/perfumed air cylinder. The electromechanical releasing means opens a lid of the cylinder for a period determined by the timing circuit to dilute the polluted gases sensed in the predetermined space. The electromechanical releasing means preferably is a solenoid valve, or an electric motor with lever/gear mechanism, to open the lid of the oxygen/fresh air/perfumed air cylinder for releasing the oxygen/fresh air/perfumed air into the polluted space for thereby diluting the sensed pollution to a desired limit.

In another aspect of this invention there is provided a process for controlling air pollution by diluting polluted air ambient with controlled addition thereto of fresh air/oxygen/perfumed air until a desired pollution limit is realized.

The preferred method comprises the steps of:

sensing the polluting gases in a predetermined space and generating a corresponding signal, conditioning the sensed signal, comparing the conditioned signal with a reference signal set by the user, releasing the oxygen/fresh air/perfumed air when the sensed pollution level exceeds the reference pollution level, until the polluting gases present in the said space are diluted to desired limits.

BRIEF DESCRIPTION OF THE DRAWING

This invention will now be described with reference to the accompanying drawings, in which:

FIG. 3 is a graphical representation of selected data on sulphur dioxide concentration from 1978 to 1990.

FIG. 4 graphically presents the annual 98 percentile sulphur dioxide concentration for data the same locations and years as in FIG. 3.

DETAILED DESCRIPTION OF THE PREFERRED EMBODIMENTS

Figure 1A:
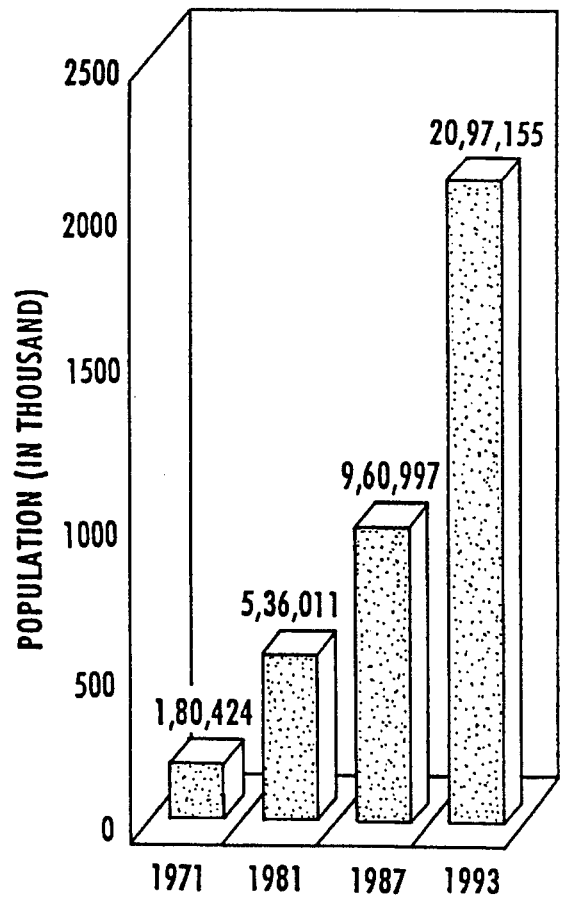
FIG. 1 shows vehicular population and vehicular pollution load.
Figure 1B:
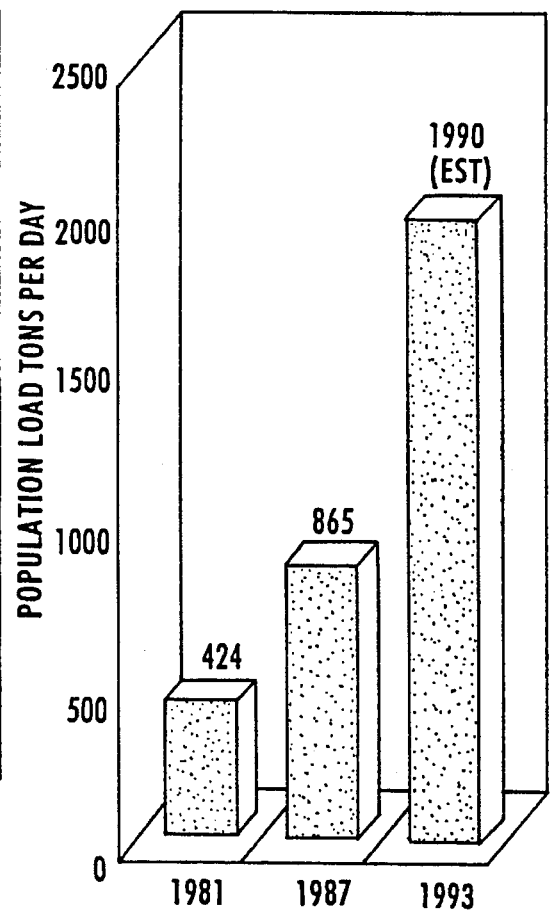
Figure 2:
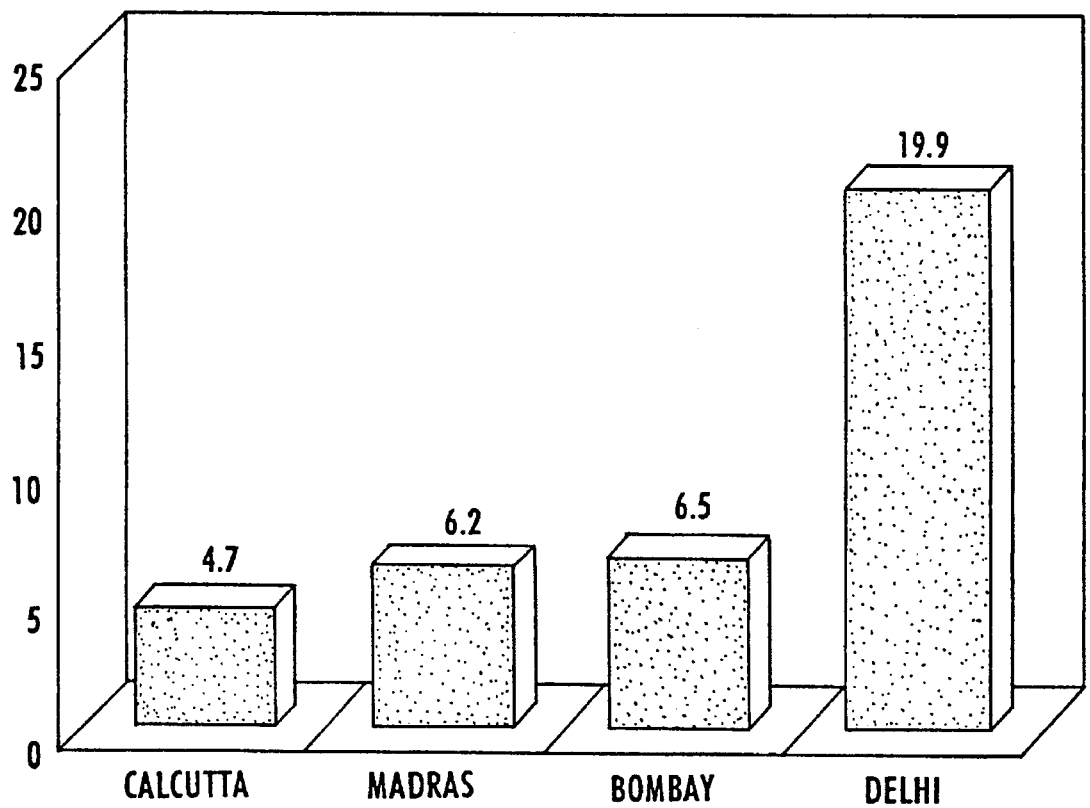
FIG. 2 shows vehicular population in selected metropolitan/city areas.
Figure 5:
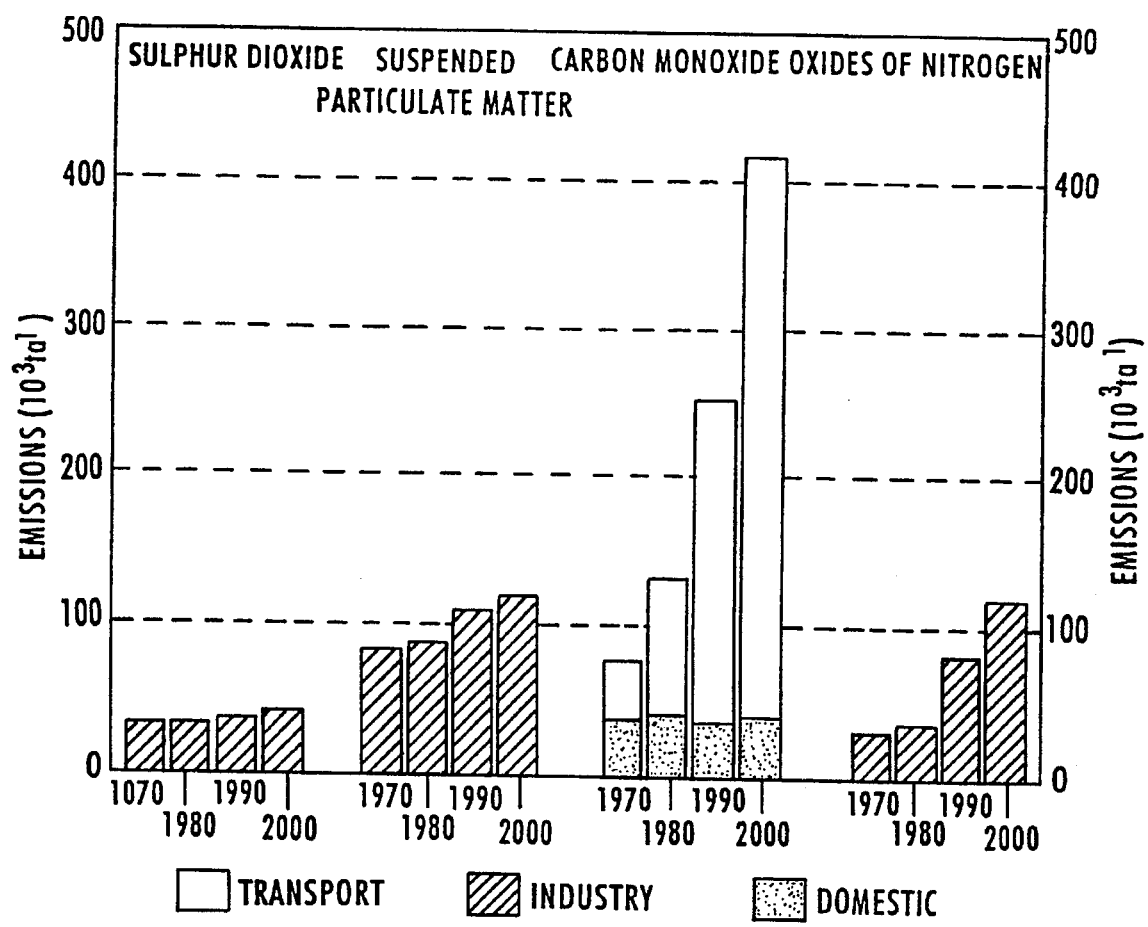
FIG. 5 shows the estimated and projected anthropogenic emissions of carbon monoxide, sulphur dioxide SPM and oxides of nitrogen.
Figure 6:
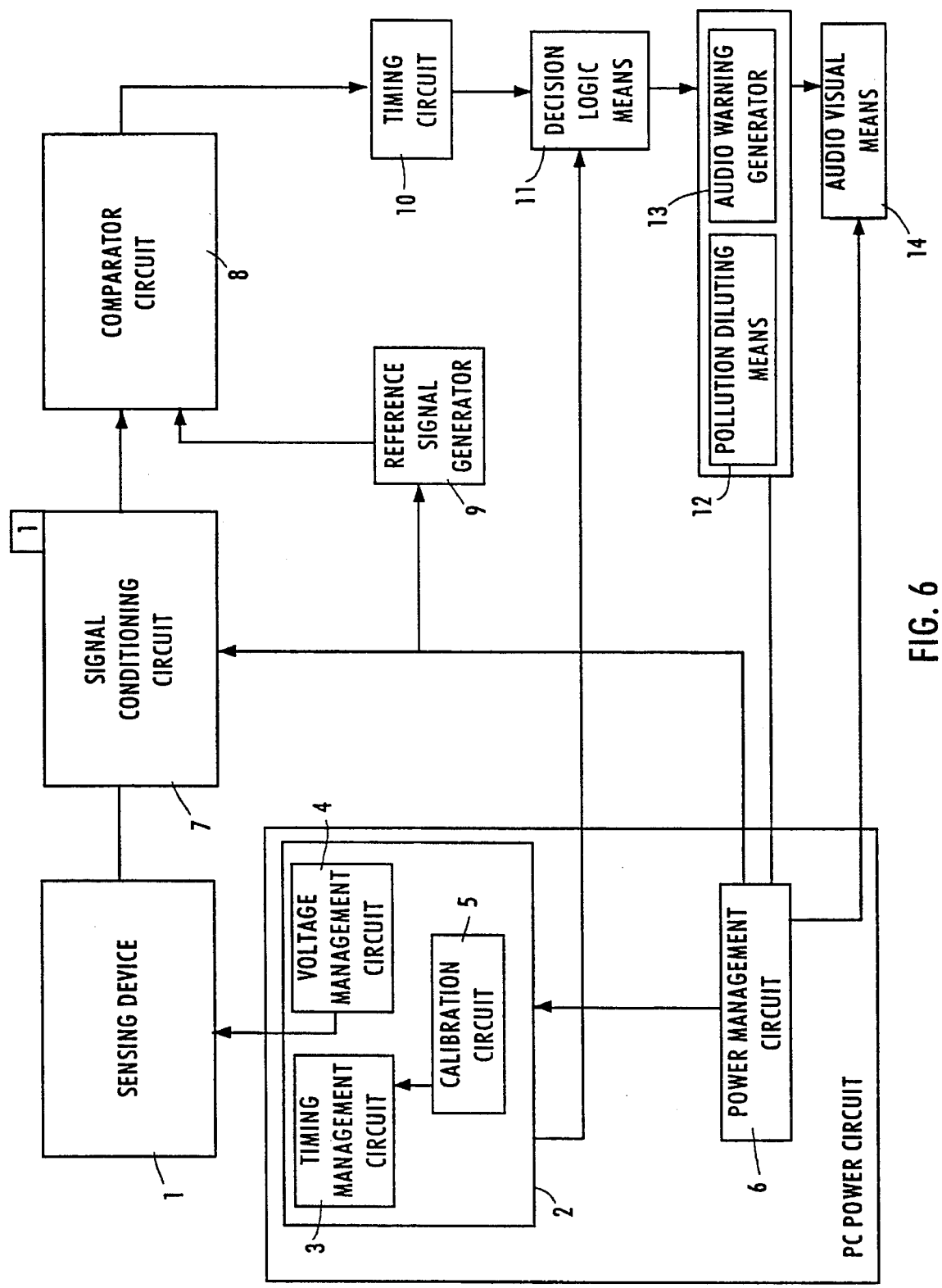
FIG. 6 is a schematic diagram of the preferred embodiment of the air pollution control device according to this invention.
Figures 8, 9:
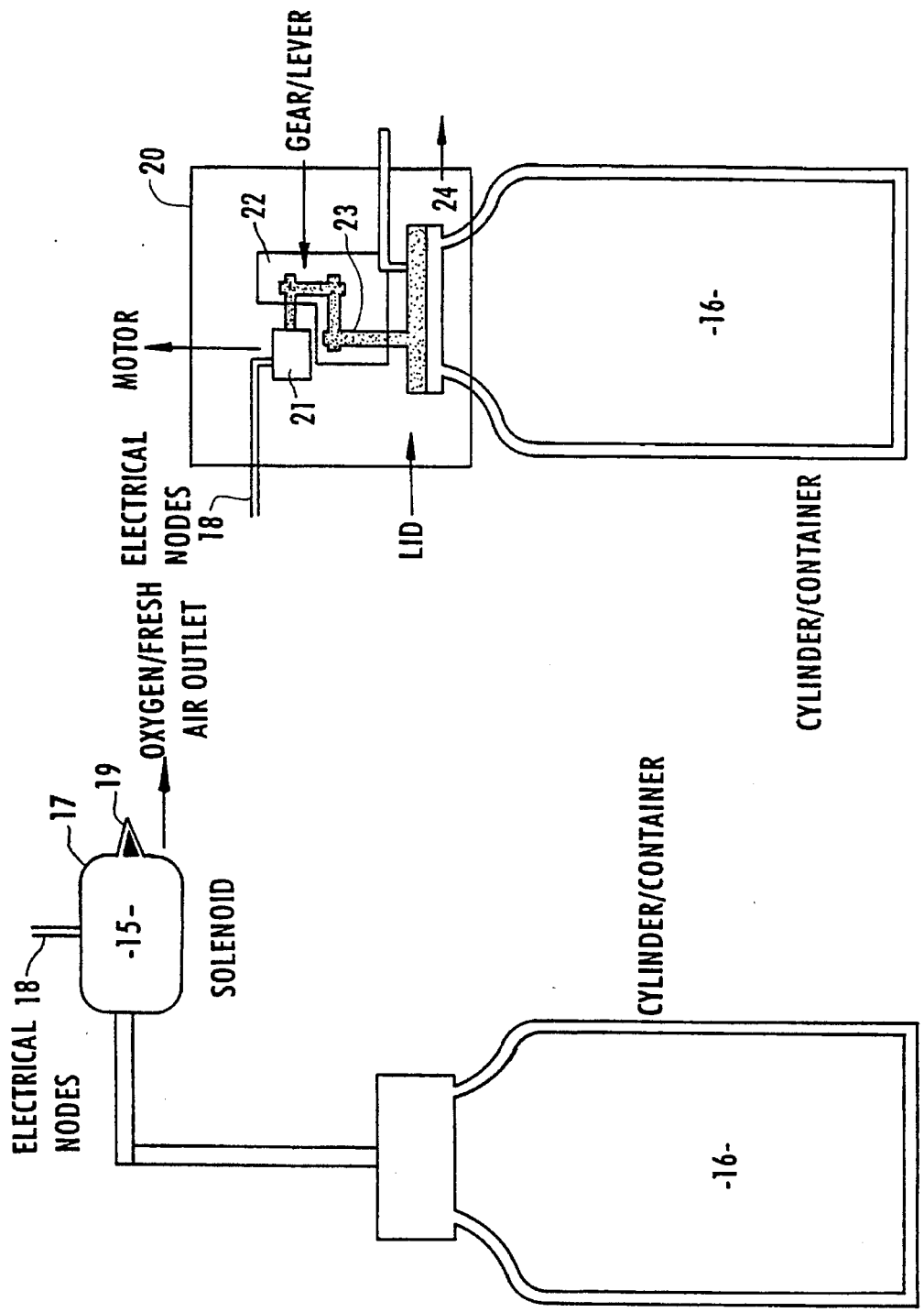
FIGS. 8 and 9 schematically show respective alternative forms of the pollution dilution means comprising electromechanical releasing means for supplying oxygen/fresh air/perfumed air from the cylinder according to this invention.

Referring to FIG. 6 of the accompanying drawings, item (1) shows the sensing device, (2) shows the parameter controller and (PC) shows the power circuit. The power circuit (PC) includes a parameter controller circuit (2) and a power management circuit (6). The parameter controller (2) is connected to a decision logic means (11) for providing help in taking decisions. The parameter controller (2) consists of a calibration circuit (5) which is connected to a timing management circuit (3) and a voltage management circuit (4). The output of the voltage management circuit is fed to the sensing device (1) for its monitoring. The output of the sensing device (1) is fed to signal conditioning circuit (7) to amplify the sensed signal. The signal conditioning circuit (7) has an indicator (I) which indicates a current pollution level/reference pollution level. The signal conditioning circuit (7) is connected to a comparator circuit (8) which compares the output of signal conditioning circuit (7) with the output of a reference signal generator (9). The comparator circuit (8) is connected to a timing circuit (10) for determining the time during which the pollution diluting means (12) is kept activated for a suitable period, until the polluted air is diluted to a selected desired limit. The timing circuit (10) is connected to decision logic means (11) which determines when to generate an audio/visual warning signal and/or to simultaneously operate the pollution diluting means (12) to release the oxygen, fresh air, or perfumed air from the cylinder (16) as the case may be. The pollution diluting means consists of oxygen/fresh air cylinder (16) and electromechanical releasing means. The electromechanical means is a solenoid valve (15) shown in FIG. 8 or an electric motor (21) with lever/gear (22, 23) as shown in FIG. 9 which moves accordingly to open a lid (24) of the said cylinder (16) or switches on the oxygen supply.

Figure 7:
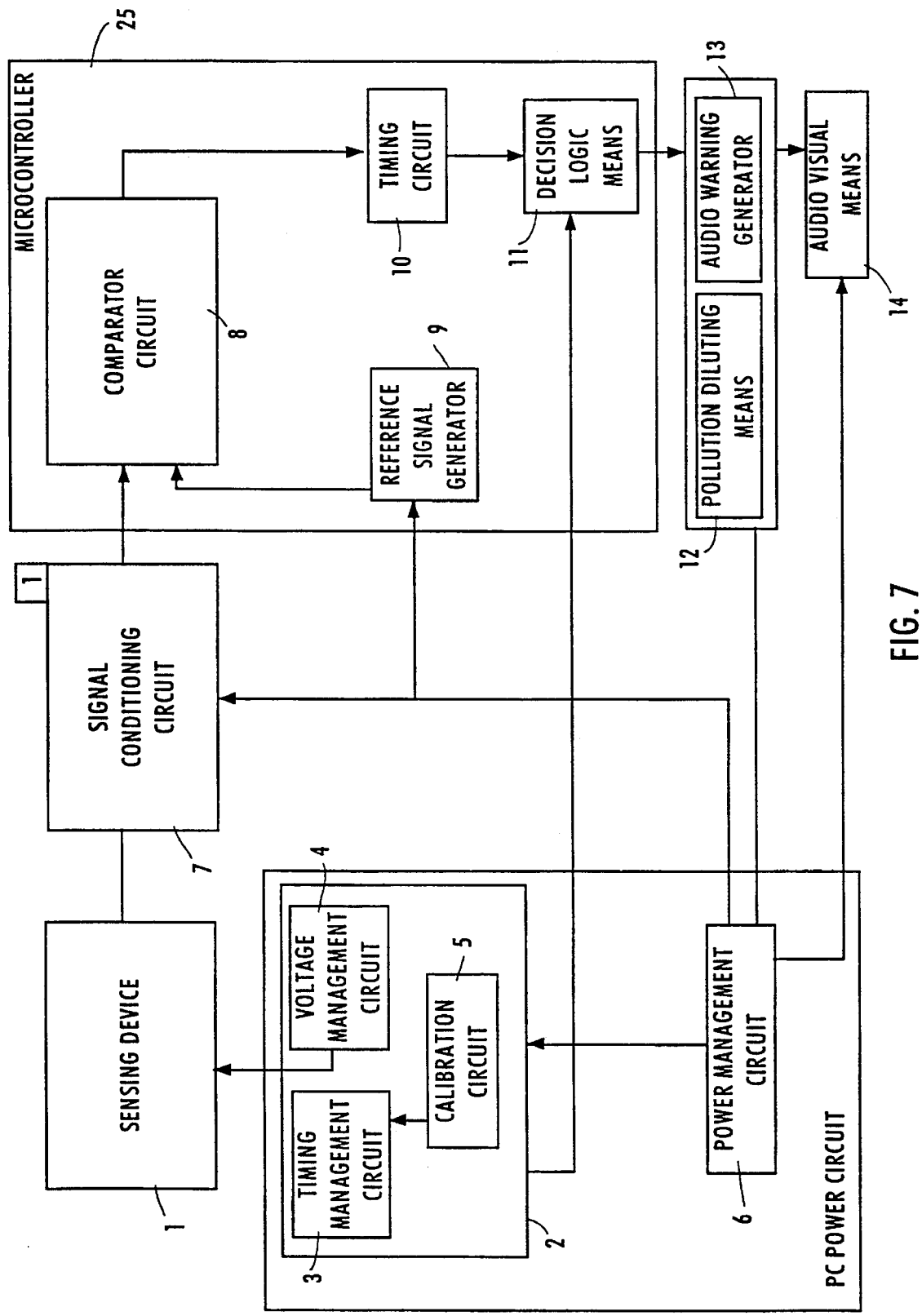
FIG. 7 is a schematic view of the air pollution control device of FIG. 6 using a microcontroller according to this invention.

This device is further simplified by embodying the comparator circuit (8), timing circuit (10), reference signal generator circuit (9) and decision logic means (11) in a microcontroller (25), as schematically shown in FIG. 7.

The sensing device may consist of a plurality of electrochemical sensors, for carbon monoxide, sulphur dioxide, and nitrogen peroxide respectively, and may include humidity and temperature sensors. The sensors are preferably connected in parallel and operate simultaneously in conjunction with each other. Power circuit (PC) manages the power supply to various units of the device.

To operate the above-described device, the power circuit (PC) is switched on, the sensing device (1) is activated to selectively sense at least one of carbon monoxide, sulphur dioxide, nitrogen peroxide, humidity and temperature. The moment that at least one of the polluting gases exceeds a corresponding predetermined limiting value indicated by the Indicator (I) in the predetermined space, decision logic means (11) determines operation of the audio visual warning means (13) and pollution diluting means (12) simultaneously for the time decided by timing circuit (10) and thereby releases one of oxygen, fresh air, or perfumed air from the cylinder (16) into the selected space and thereby dilute the pollution in the space to below a desired limit.

This is a handy device and can be installed in a car or an ambulance, or can be carried by persons while walking on road or waiting at crossings for the signal. Since the air pollution control device works automatically, it does not require any individual attention for monitoring and thereby avoids health hazards.

Although the present invention has been described and illustrated in detail, it should be clearly understood that the same is by way of illustration and example only and is not to be taken by way of limitation, the spirit and scope of the present invention being limited only by the terms of the appended claims.

I claim:

1. An air pollution control device for controlling ambient air pollution in a predetermined space, comprising:

at least one sensing device for sensing at least one selected polluting gas in said space and for generating a corresponding signal;

a signal conditioning circuit for receiving and amplifying said signal generated by said sensing device;

a comparator circuit for comparing the amplified signal with a predetermined reference signal and providing a corresponding output signal;

a timing circuit for receiving the output signal from said comparator circuit and generating a corresponding timing signal;

pollution diluting means for providing at least one diluting gas for diluting the at least one polluting gas present in said space until desired limits are reached;

decision logic means responding to said timing signal for controlling activation of said pollution diluting means; and audio/visual means for indicating that the at least one pollutant gas is present and needs to be diluted and for responding to said activation of said pollution dilution means.

2. The air pollution control device according to claim 1, wherein:

said sensing device comprises electrochemical sensors/transducers, including thermoelectric and humidity sensors.

3. The air pollution control device according to claim 2, wherein:

said electrochemical sensors are respectively sensitive to oxides of carbon, sulphur, nitrogen and hydride of nitrogen.

4. The air pollution control device according to claim 1, wherein:

an indicator means is provided in the signal conditioning circuit to selectively indicate a current pollution level and a reference pollution level.

5. The air pollution control device according to claim 1, further comprising:

a power circuit which includes a power management circuit and a parameter controller for monitoring said at least one sensing device.

6. The air pollution control device according to claim 1, further comprising:

a parameter controller which comprises a calibration circuit connected to a timing management circuit and a voltage management circuit, an output of the voltage management circuit being fed to said sensing device for monitoring thereof at predetermined conditions.

7. The air pollution control device according to claim 1, wherein:

two or more sensing devices are connected in parallel in the air pollution device, for improved functioning thereof.

8. The air pollution control device according to claim 1, further comprising:

a reference signal generator means for generating a reference signal provided to the comparator circuit for generating said timing signal in correspondence therewith, wherein the comparator circuit, the timing circuit, the reference signal generator means, and the decision logic means are all embodied in a microcontroller comprising means for automatic operation.

9. The air pollution control device according to claim 1, wherein:

said pollution dilution means consists of an electromechanical releasing means connected to a cylinder supplying at least one of oxygen, fresh air, and perfumed air, said electromechanical releasing means opening a lid of the said cylinder for a period determined by said timing circuit to thereby dilute the polluted gases in the predetermined space.

10. The air pollution control device according to claim 1, further comprising:

an electromechanical releasing means which comprises one of a solenoid valve or an electric motor with a lever/gear mechanism to open a lid of the cylinder.

* * * * *